United States Patent
Tarantino

(10) Patent No.: US 8,712,378 B1
(45) Date of Patent: Apr. 29, 2014

(54) AUTHORIZATION METHOD FOR LOCATION BASED SERVICES

(75) Inventor: Roy Tarantino, South River, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 124 days.

(21) Appl. No.: 13/194,541

(22) Filed: Jul. 29, 2011

(51) Int. Cl.
*H04M 1/66* (2006.01)
*H04W 24/00* (2009.01)

(52) U.S. Cl.
USPC .................................... 455/411; 455/456.1

(58) Field of Classification Search
USPC ............ 455/456.1–456.6, 410–411, 418–420
See application file for complete search history.

(56) References Cited

U.S. PATENT DOCUMENTS

| | | |
|---|---|---|
| 2006/0036680 A1* | 2/2006 | Shim ............................ 709/203 |
| 2008/0014990 A1* | 1/2008 | Jain et al. ...................... 455/558 |
| 2010/0228847 A1* | 9/2010 | Choi ............................. 709/223 |
| 2010/0267398 A1* | 10/2010 | Kim et al. .................. 455/456.3 |
| 2011/0136472 A1* | 6/2011 | Rector et al. .................. 455/411 |

* cited by examiner

Primary Examiner — Brandon Miller

(57) ABSTRACT

A MLP request message is transmitted through a wireless mobile communication network, from a mobile station to a SUPL server. The MLP request message contains credential information for an AGPS application running on the mobile station. After the MLP request message has been transmitted, a MLP response message is transmitted through the network from the SUPL server to the mobile station. The MLP response message is responsive to the credential information and indicates whether the SUPL server has authorized the AGPS application. If the AGPS application is authorized, communication between the AGPS application and the SUPL server, through the network, implements a function of the AGPS application.

14 Claims, 5 Drawing Sheets

AUTHORIZATION METHOD FOR LOCATION BASED SERVICES

TECHNICAL FIELD

The present subject matter relates to techniques and equipment to provide mobile device authorization for location based communications between the mobile device and a location determination server, such as a secure user plane location (SUPL) server.

BACKGROUND

In recent years, more and more mobile applications utilize the location of a user for various functions. Many of these mobile applications make use of the Global Positioning System (GPS). GPS is technology based on satellite signals and a GPS receiver in the mobile station. When a mobile station can directly locate and receive the satellite signals, there may be no need for the mobile station to request network assistance. When the GPS satellites are not visible to the mobile station, the mobile station can request and use the wireless network to provide the location of satellites or to calculate the actual location of the mobile station. Network assistance is needed if the mobile station is located in conditions where there is no visibility to the satellites (e.g., indoors or in a city with tall buildings that obstruct access to the sky). Network assistance may also be provided to help speed the processing to acquire satellite signals and/or to process satellite signal measurements from the GPS receiver to obtain the initial position fix when the mobile station requires a series of position fixes to continuously track its location. The mobile station makes assistance requests on behalf of applications that are running on the mobile station. If an application requests location that results in assistance by the wireless network, the application is known as an Assisted Global Positioning System (AGPS) application.

There are strict requirements on AGPS applications for user permissions and privacy. If a particular application meets those requirements and the wireless carrier authorizes the application to use AGPS network service, then the application receives credentials for AGPS. AGPS credentials consist of an Application identifier (ID) and Password. Before allowing use of AGPS, the application must send credentials from the application server to the network server that provides the location assistance. The network server that provides assistance is known as the SUPL Server. The SUPL Server maintains a database of all valid applications and verifies the validity of the credentials by lookup of the status of the credentials in the database. If it is determined that the application is no longer allowed to use AGPS, the application's AGPS credentials are revoked by changing the status of the credentials in the database. The next time the application attempts to use AGPS, the SUPL Server will reject the request until the credentials are restored.

Various protocol modules for AGPS authorization are based on proprietary technology. Implementation of these protocols is costly and time consuming resulting in limited mobile station support and adaption of AGPS services of various carriers. Many mobile station and application developers refuse to implement specific AGPS for various carriers because it requires development from scratch with no reuse on other carriers' wireless networks.

Hence a need exists for an improved AGPS Application Authorization process and an improved AGPS Application Authorization Protocol (AAAP).

SUMMARY

The teachings herein alleviate one or more of the above noted problems with conventional AGPS authorization protocols.

To support AAAP, software is developed for both the mobile station and the SUPL server. An AAAP module is implemented on the mobile station to send AGPS credentials to the SUPL server, and a corresponding SUPL Server module is implemented to receive and validate credentials. When the foundation of AAAP is based on industry standard Mobile Location Protocol (MLP), it is easier to implement on both the mobile station and the SUPL server. Basing AAAP on MLP may also result in faster implementation and more widespread support for carrier-specific AGPS.

As a result, industry standard MLP may be extended to include carrier specific handling of AGPS credentials in AAAP. Because MLP has been adapted by the industry as a standard and reference implementations are available, time to implementation and commercial availability of carrier-specific AGPS applications may be improved.

One exemplary method includes transmitting a MLP request message through a wireless mobile communication network, from a mobile station to a SUPL server. The MLP request message contains credential information for an AGPS application running on the mobile station. After the MLP request message has been transmitted, the method further includes receiving a MLP response message, through the network from the SUPL server. The MLP response message is responsive to the credential information and indicates whether the SUPL server has authorized the AGPS application. If the AGPS application is authorized, the method further includes communicating between the AGPS application and the SUPL server, through the network, to implement a function of the AGPS application.

An exemplary mobile station includes a wireless transceiver, a GPS receiver, a processor, memory, and programming. The wireless transceiver allows wireless mobile communication through a wireless mobile communication network. The processor is coupled to the transceiver and the GPS receiver. The memory is accessible by the processor. The programming is in the memory for the processor. Execution of the programming by the processor configures the mobile station to perform functions. Such functions include functions to transmit a MLP request, receive a MLP response message, and communicate between an AGPS application and a SUPL server, through the network to implement a function of the AGPS application. The MLP request message is transmitted through the network to the SUPL server. The MLP request message contains credential information for the AGPS application running on the mobile station. The MLP response message is received through the network from the SUPL server. The MLP message is generated in response to the credential information, and indicates whether the SUPL server has authorized the AGPS application. Communication between the AGPS application and the SUPL server is responsive to an indication of authorization of the AGPS application.

Another exemplary method includes steps of receiving a MLP request message containing credential information, and determining whether an AGPS application is authorized for AGPS transactions with a server, based on the credential information. The MLP request message is received at the server, from a mobile station. The MLP request message passes through a wireless mobile communication network. The credential information of the MLP request message is for the AGPS application running on the mobile station. If it is determined that the AGPS application is authorized, a MLP response message is transmitted through the network to the mobile station. The MLP response message indicates that the AGPS application is authorized for AGPS transactions. Once the AGPS application is authorized, communication between the AGPS application and the server occurs, through the network, to implement a function of the AGPS application.

An exemplary location determination server includes an interface, a processor, a storage device, and programming. The interface allows communication through a wireless mobile communication network with a mobile station. The processor is coupled to the interface. The storage device is accessible by the processor. The programming is in the storage device for the processor. Execution of the programming by the processor configures the location determination server to perform functions. Those functions include a function to receive a MLP request message containing credential information for an AGPS application running on the mobile station. The MLP request message is received through the network from the mobile station. The functions also include a function to determine whether the AGPS application is authorized for AGPS transactions with the server, based on the credential information. If a determination is made that the AGPS application is authorized, responsive to the determination, a MLP response message is transmitted through the network to the mobile station. The MLP response message indicates that the AGPS application is authorized for AGPS transactions. Also, responsive to the determination, communications are initiated between the AGPS application and the server, through the network to implement a function of the AGPS application.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The disclosure herein relates to AAAP, a method for authorizing the use of an application that utilizes a wireless network to acquire the location of a mobile station. Extensions to MLP are used to determine if the application is valid and authorized to use network assistance in determining the location of the mobile station. Generally, in accordance with certain aspects of the present disclosure, the entities involved in validation have a tight coupling (i.e., significant overlap) with the entities involved in application implementation. When validation and application entities have a tight coupling, both may be contained in a single runable application module. Such a single runable application module may reduce or even eliminate some complexity associated with conventional approaches, where validation and application entities are loosely coupled or decoupled (i.e., one entity initiates validation and a separate entity initiates implementation). Alternatively, if there is a secure connection or other trust relationship between the validation entity and the implementation entity, the validation and application entities of the present disclosure can be loosely coupled or decoupled. Thus, the validation entity might work on behalf of a set of related application implementations. A decoupled configuration allows for the validation function to be centralized to provide simplified and expeditious implementation. Further, with loose coupling, the validation entity can validate AGPS access for a set of applications that are completely carrier agnostic.

The disclosed methods may provide advantages over protocol modules for AGPS authorization based on proprietary technology. In particular, savings may be obtained by reducing costs and time associated with implementation of proprietary protocols. Further, the methods of the instant disclosure may provide for a universal authorization protocol, allowing mobile station and application developers to avoid development of multiple carrier specific AGPS implementations. Industry standard MLP may be extended to include carrier specific handling of AGPS credentials in AAAP. Because MLP has been adapted by the industry as a standard and reference implementations are available, time to implementation and commercial availability of carrier-specific AGPS applications may be improved. Reference now is made in detail to the examples illustrated in the accompanying drawings and discussed below.

Figure 1:
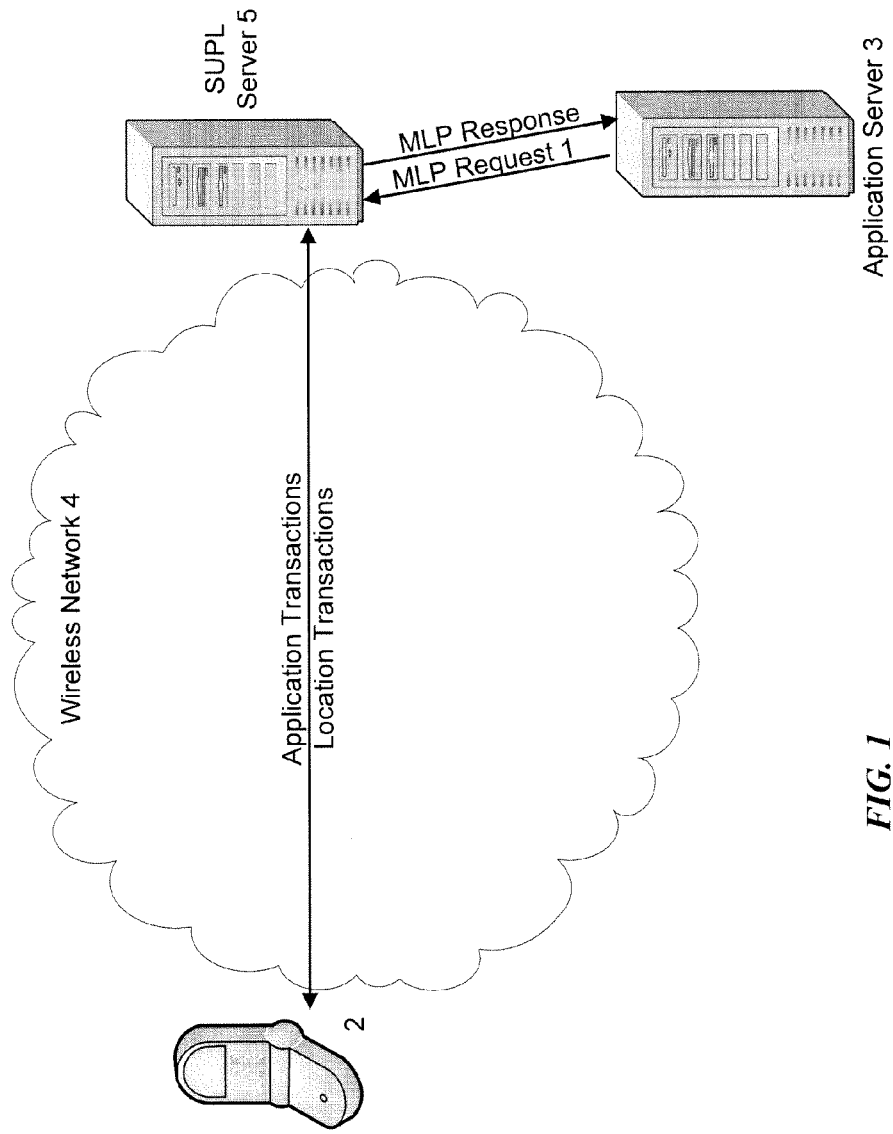
FIG. 1 is a simplified functional diagram illustrating a conventional use of Mobile Location Protocol (MLP).

FIG. 1 illustrates a conventional use of MLP. MLP has been used for network originated requests. Thus, a MLP Request 1 to locate a user of a particular mobile station 2 originates from an application server 3 on the Internet, not from the mobile station 2 through a wireless network 4. In such a configuration, the application server 3 does not communicate directly with the mobile station 2. Instead the SUPL server 5 is used as an intermediary. In such a configuration, MLP messages are not sent over the wireless network 4, and do not originate or terminate at the mobile station 2. Rather MLP messages of such configurations only pass between servers like 3 and 5.

Figure 2:
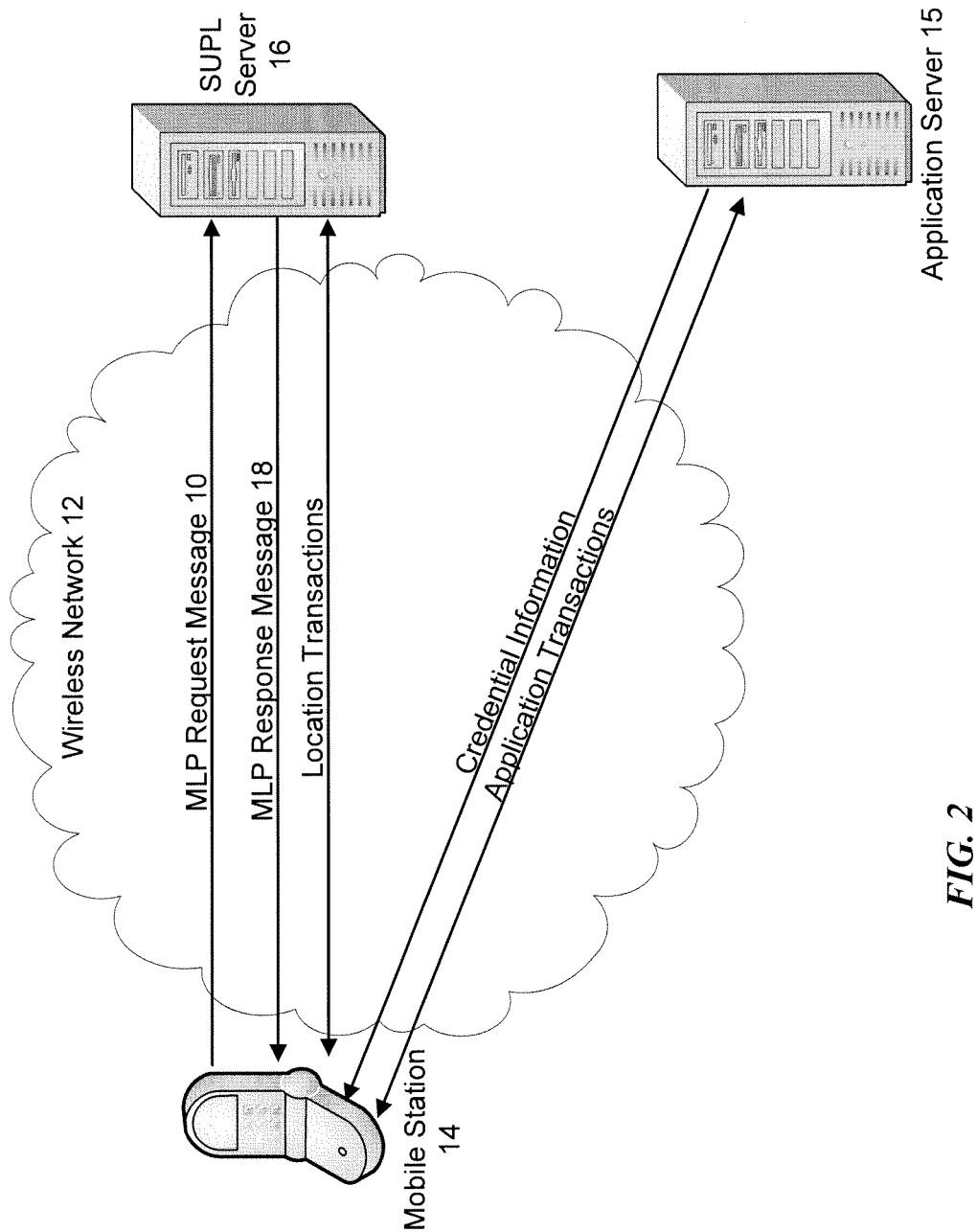
FIG. 2 is a simplified functional diagram illustrating MLP message communications through a wireless network.

Referring now to FIG. 2, in accordance with one example of the present disclosure, a mobile station 14 retrieves credential information from an application server 15 via a wireless mobile communication network 12. A MLP request message 10 is then transmitted through the wireless mobile communication network 12, from the mobile station 14 to a location determination server, such as a SUPL server 16. The request contains credential information for an AGPS application running on the mobile station 14. The SUPL server 16 processes the AGPS application credential information to determine whether the AGPS application is authorized. Responsive to a determination of authorization based on the credential information, the SUPL server 16 transmits and the mobile station 14 receives a MLP response message 18, through the network 12. The MLP response message 18 indicates whether the SUPL server 16 has authorized the AGPS application. Responsive to an indication of authorization of the AGPS application, the AGPS application on the mobile station 14 and the application server 15 communicate, through the network 12, to implement a function of the AGPS application. Examples of functions of the AGPS application include acquisition assistance, processing of GPS signal measurement to complete location computation, and/or location fix by other means when GPS is unavailable.

Figure 3:
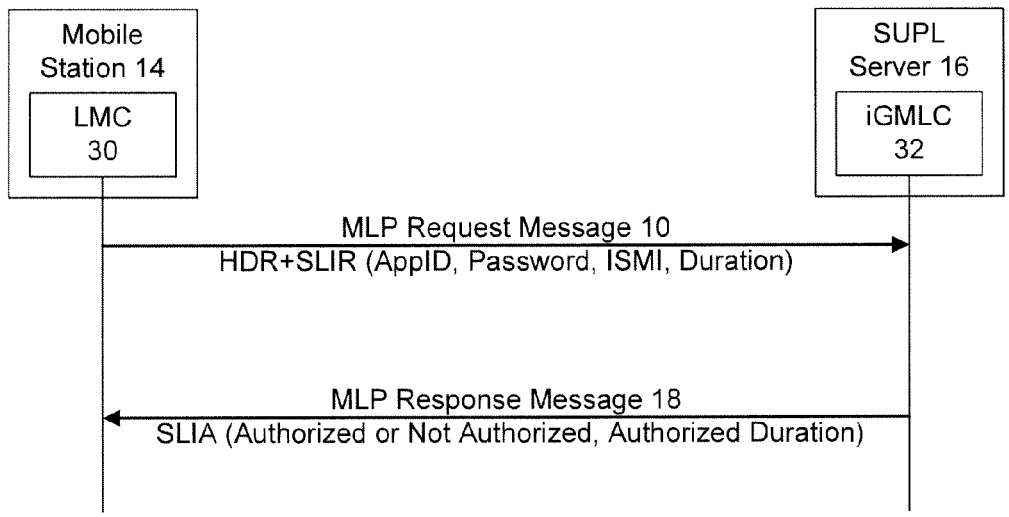
FIG. 3 is a simplified functional diagram illustrating a MLP messaging process.

Referring to FIG. 3, the MLP request message 10 includes credential or other identifying information from the mobile station 14. Such information includes a header (HDR) and Standard Location Immediate Request (SLIR). A Location Manager Client (LMC) 30 on the mobile station 14 serves as a source, obtaining information from the AGPS application running on the mobile station 14 and transmitting the information to an intelligent Gateway Mobile Location Center (iGMLC) 32 on the SUPL server 16. The SLIR includes identification of the AGPS application running on the mobile station 14, a password, an International Mobile Subscriber Identity (ISMI) of the mobile station 14 and/or a duration value.

The MLP response message 18 includes authorization or other information from the SUPL server 16. The MLP response message 18 may further include information including request and session identifiers and may be configured with fields allowing for additional information or other future expansion. Information from the SUPL server 16, including a Standard Location Immediate Answer (SLIA), is transmitted from iGMLC 32 on SUPL server 16 to LMC 30 on mobile station 14. The SLIA includes an indication of denial of authorization, authorization, and/or authorized duration. If it is determined that the AGPS application is authorized, the MLP response message 18 will indicate that the AGPS application is authorized for AGPS transactions.

The AGPS application may be any of a number of different applications for execution on the mobile device 14 capable of using AGPS information. For example, the AGPS application may determine directions, routing, and/or position of the mobile station 14. In some examples, the AGPS application may provide maps and/or related location specific information for output to the user via the mobile station 14. Thus, the AGPS may function to determine position of the mobile station 14 and provide a wide range of location related functions or features.

Figure 4:
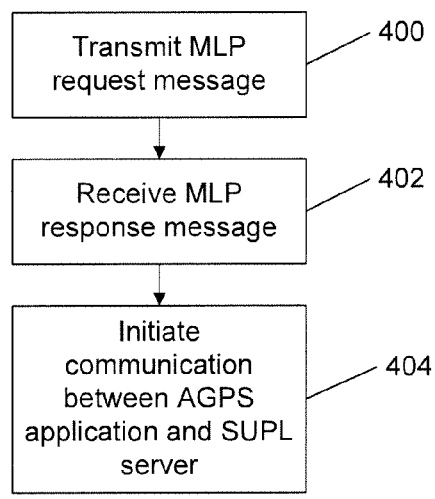
FIG. 4 illustrates a method of transmitting and receiving MLP messages through a wireless network, from a mobile station or AGPS application perspective.

FIG. 4 illustrates an exemplary method, from a mobile station or AGPS application perspective. The method involves transmitting the MLP request message 10 through the network 12, receiving the MLP response message 18 through the network 12, and communicating between the AGPS application and the SUPL server 16 through the network 12. More particularly, at step 400, the mobile station 14 transmits (via LMC 30) the MLP request message 10 through the network 12 to the SUPL server 16 (via iGMLC 32). The MLP request message contains credential information for the AGPS application running on the mobile station 14. At step 402, the SUPL server 16 transmits (via iGMLC 32) and the mobile station 14 receives (via LMC 30) the MLP response message 18, through the network 12. Such communication is responsive to the credential information and indicates whether the SUPL server 16 has authorized the AGPS application. At step 404, responsive to an indication of authorization of the AGPS application, communication between the AGPS application and the SUPL server 16 occurs through the network 12. Such communication implements a function of the AGPS application.

Figure 5:
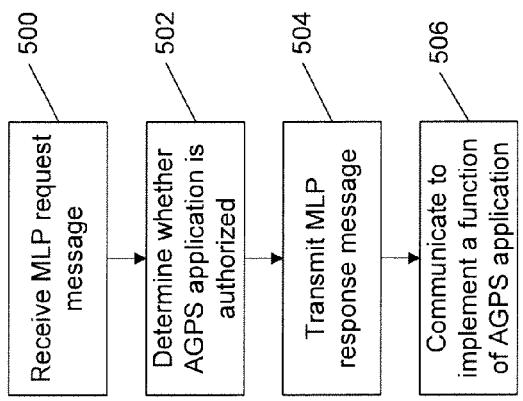
FIG. 5 illustrates a method of transmitting and receiving MLP messages through a wireless network, from a server perspective.

FIG. 5 depicts an exemplary method, from a server perspective. Here, the method involves receiving the MLP request message 10 through the network 12, at a server (e.g., SUPL server 16), determining whether the AGPS application is authorized, and transmitting the MLP response message 18 through the network 12 to the mobile station 14. More particularly, at step 500, the SUPL server 16 receives the MLP request message 10, from the mobile station 14, through the network 12. The MLP request message 10 contains credential information for the AGPS application running on the mobile station 14. At step 502, based on the credential information, the SUPL server 16 determines whether the AGPS application is authorized for AGPS transactions with the SUPL server 16. At step 504, responsive to a determination that the AGPS application is authorized, the SUPL server 16 transmits the MLP response message 18, through the network 12, to the mobile station 14. The MLP response message 18 indicates that the AGPS application is authorized for AGPS transactions. After the AGPS application has been authorized, at step 506, the SUPL server 16 communicates with the AGPS application through the network 12 to implement a function of the AGPS application.

In one example, an interface between a Nokia Siemens Network (NSN) iGMLC and a Location Manager Client (LMC) 30 for Verizon's Location Based Services (LBS) deployment is based on the MLP version 3.2 from the Open Mobile Alliance (OMA). In this example, the use of MLP 3.2 as an authorization protocol is in a non-location centric fashion. MLP is used as it stands as far as possible, allowing the technical approach to conform to the Extensible Markup Language Document Type Definition (XML DTD) and make use of as much of the standardized MLP as possible. The MLP Standard Location Immediate Service (SUS) of this example delivers the authorization service, via a SYNChronous mode of operation (i.e., not an ASYNChronous mode of operation). An application ID, password, IMSI, and duration are carried in the MLP request message. The application ID is in a MLP <client><id> parameter identifying the AGPS application 76 that is requesting AGPS service. The password is in a MLP <client><pwd> parameter, the ISMI is a MLP <msid> parameter that identifies the mobile station 2. The duration value is in a MLP <max_locage> parameter. Paramaters carried in the MLP response message include an indication of "Authorized" or "Authorization Failed," and an authorized duration in an <add_info> parameter when "Authorized." The iGMLC 32 is addressed using the pre-configured Fully Qualified Domain Name (FQDN) in the LMC. Domain Name System (DNS) is used to reconcile that FQDN to the IP Address of the iGMLC 32. The interface of this example is secured by Secure Sockets Layer (SSL). The SSL procedures allow the LMC 30 to authenticate the iGMLC 32 via a digital certificate and encrypt the MLP messages between the mobile station 2 and the iGMLC 32. The MLP request message from the LMC 30 arrives at the iGMLC 32 on a dedicated port number so that it is processed appropriately, where the port number is to be determined.

More generally, the LMC 30 initiates the procedure by sending a MLP request message to the iGMLC 32. The message carries parameters such as application identification, password, ISMI, and duration value. Upon reception of the MLP request message, the iGMLC 32 performs authorization verification of the request. The iGMLC 32 returns a MLP answer message to the LMC 30. This message contains the result of the authorization verification in the MLP, which can take values such as "ok," "unauthorized application" (when the application identification is unknown), "unknown subscriber" when the subscriber is unknown or not allowed to use the service of the SUPL server 16, or other indications of syntax errors. If the application identification is authorized, then the optional parameter for duration will be populated with the authorized duration (e.g., a particular time span, measured in seconds). The LMC 30 receives the MLP response and processes it in accordance with its rules.

Figure 6:
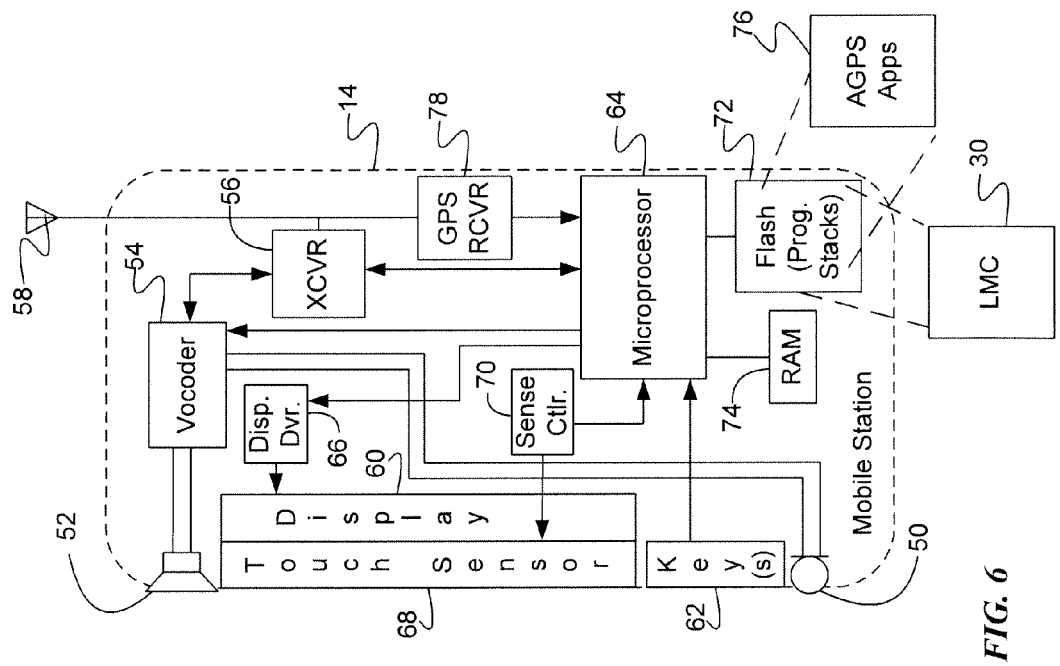
FIG. 6 is a high-level functional block diagram of an exemplary mobile station.

Those skilled in the art presumably are familiar with the structure, programming and operations of the various type of mobile stations. However, for completeness, it may be useful to consider the functional elements/aspects of an exemplary mobile station 14, at a high-level. The following description of the structure and operation of the mobile station 14 is by way of example, only. For purposes of such a discussion, FIG. 6 provides a block diagram illustration of an exemplary touchscreen type mobile station 14. Those skilled in the art will appreciate, however, that the AGPS authorization functions of the mobile station may be implemented in other types of mobile stations, including non-touch mobile stations. Although the mobile station 14 may be a device without a user interface, such as a device used for machine to machine applications, or the mobile station 14 may be a smart-phone or may be incorporated into another device, such as a personal digital assistant (PDA), a netbook or notebook type a PC, a tablet computer or the like, for discussion purposes, the illustration shows the mobile station 14 is in the form of a portable touchscreen type handset device. The handset example of the mobile station 14 functions as a normal digital wireless telephone station. For that function, the mobile station 14 includes a microphone 50 for audio signal input and a speaker 52 for audio signal output. The microphone 50 and speaker 52 connect to voice coding and decoding circuitry (VOCODER) 54. For a voice telephone call, for example, the VOCODER 54 provides two-way conversion between analog audio signals representing speech or other audio and digital samples at a compressed bit rate compatible with the digital protocol of wireless telephone network communications or voice over packet Internet Protocol (IP) communications.

For digital wireless communications, the mobile station 14 also includes at least one digital transceiver (XCVR) 56. Today, the mobile station 14 would be configured for digital wireless communications using one or more of the common network technology types. The concepts discussed here encompass examples of the mobile station 14 utilizing any digital transceivers that conform to current or future developed digital wireless communication standards. The mobile station 14 may also be capable of analog operation via a legacy network technology.

The transceiver 56 provides two-way wireless communication of information, such as vocoded speech samples and/or digital information, in accordance with the technology of the network 12. The transceiver 56 also sends and receives a variety of signaling messages in support of the various voice and data services provided via the mobile station 14 and the network 12. Each transceiver 56 connects through radio frequency (RF) send and receive amplifiers (not separately shown) to an antenna 58. The transceiver 56 may also support various types of mobile messaging services, such as short message service (SMS), enhanced messaging service (EMS) and/or multimedia messaging service (MMS).

A GPS receiver 78 may share the same antenna 58 used by the transceiver 56, or there may be a separate additional antenna for the GPS receiver 78. Under control of the microprocessor 64, the GPS receiver 78 receives and processes signals from one or more satellites of the constellation of GPS satellites. From its processing, the GPS receiver 78 supplies GPS data to the microprocessor 64, such as pseudorange measurements and associated PN codes for measured satellite signals. Associated computations may be performed in the microprocessor 64 or by a processor or the like included in the GPS receiver 78.

The mobile station 14 includes the display 60 for displaying videos, web pages, text or multimedia for incoming or outgoing messages, menus or the like, as well as call related information received from the network or dialed by the user such as calling party numbers, etc. For example, the touchscreen display 60 and function key 62 may enable dialing digits for voice and/or data calls as well as generating selection inputs, for example, as may be keyed-in by the user based on a displayed menu or as a cursor control and selection of a highlighted item on a displayed screen. The touchscreen display 60 and function key 62 are the physical elements providing a textual or graphical user interface. Various combinations of the touchscreen display 60, function key 62, microphone 50 and speaker 52 may be used as the physical input/output elements of the graphical user interface (GUI), for multimedia (e.g., audio and/or video) communications. Other user interface elements may be used, such as a trackball, as in some types of PDAs or smart phones.

Hence, the exemplary mobile station 14 includes a touchscreen display 60, which a microprocessor 64 controls via a display driver 66, to present visible outputs to the device user. The mobile station 14 also includes a touch/position sensor 68 and a function key sensor (not shown). The sensor 68 is relatively transparent, so that the user may view the information presented on the touchscreen display 60. A sense circuit 70 senses signals from elements of the touch/position sensor 68 and detects occurrence and position of each touch of the screen formed by the touchscreen display 60 and sensor 68. The sense circuit 70 provides touch position information to the microprocessor 64, which can correlate that information to the information currently displayed via the touchscreen display 60, to determine the nature of user input via the screen. The key sensor (not shown) detects occurrence of activation of the function key 62 and provides function key activation information to the microprocessor 64, which can then correlate the detected user touch to the touchscreen display 60 and user activation of the function key 62 as the user input data.

In addition to normal telephone and data communication related input/output (including message input and message display functions), the user interface elements also may be used for display of menus and other information to the user and user input of selections, including any needed during input of data by the user for location based services or related output functions, which may use AGPS.

The microprocessor 64 serves as a programmable controller for the mobile station 14, in that it controls all operations of the mobile station 14 in accord with programming that the microprocessor 64 executes, for all normal operations, and for operations involved in the present disclosure. In the example, the mobile station 14 includes flash type program memory 72, for storage of various software or firmware program routines and mobile configuration settings, such as mobile directory number (MDN) and/or mobile identification number (MIN), etc. The mobile station 14 may also include a non-volatile random access memory (RAM) 74 for a working data processing memory. Other storage devices or configurations may be added to or substituted for those in the example. In a present implementation, the flash type program memory 72 stores firmware such as a boot routine, device driver software, an operating system, call processing software and VOCODER control software, and any of a wide variety of other applications, such as client browser software and short message service software. The memories 72, and 74 also store various data, such as telephone numbers and server addresses, downloaded data such as multimedia content, and various data input by the user. Native programming stored in the flash type program memory 72, sometimes referred to as "firmware," is loaded into and executed by the microprocessor 64. In advanced mobile stations, the memories also stored downloaded application programming for execution by the microprocessor 64.

As outlined above, the mobile station 14 includes a processor, and programming stored in the flash type program memory 72, configures the processor so that the mobile station is capable of performing various desired functions, including in this case the functions involved in the methods described herein. The programming, for example, includes one or more AGPS applications 76 and the LMC program 30. Of note for purposes of this discussion, execution of the LMC and/or AGPS programming by the processor configures the mobile station 14 to perform functions to (1) transmit the MLP request message 10 through the network 12 to the SUPL server 16, (2) receive the MLP response message 18 through the network 12 from the SUPL server 16, and (3) communicate between the AGPS application 76 and the SUPL server 16 through the network 12 to implement a function of the AGPS application 76. The MLP request message 10 contains credential information for the AGPS application 76 running on the mobile station 14. The MLP response message 18 is responsive to the credential information and indicates whether the SUPL server 16 has authorized the AGPS application 76. The communication between the AGPS application 76 and the SUPL server 16 is responsive to an indication of authorization of the AGPS application 76 provided by the SUPL server 16.

The SUPL server 16 or other location determination server may have an interface for communication through the network 12 with the mobile station 14, a processor coupled to the interface, and a storage device accessible by the processor. Programming may be provided in the storage device for the processor. Execution of the programming by the processor configures the SUPL server 16 to perform various functions. Such functions include receiving the MLP request message 10, determining whether the AGPS application 76 is authorized for AGPS transactions with the SUPL server 16, and, responsive to a determination that the AGPS application 76 is authorized, transmitting the MLP response message 18, through the network 12 to the mobile station 14, indicating that the AGPS application 76 is authorized for AGPS transactions, and communicating between the AGPS application 76 and the SUPL server 16, through the network 12 to implement a function of the AGPS application 76.

As shown by the above discussion, functions relating to the mobile device authorization for location based communications may be implemented on the mobile device whereas others of the relevant functions may be implemented on one or more computers connected for data communication via the components of a wireless network, operating as SUPL server. Although special purpose devices may be used, server functions may be implemented using one or more hardware platforms intended to represent a general class of data processing device commonly used to run "server" programming so as to implement the SUPL server functions discussed above, albeit with an appropriate network connection for data communication.

Figure 7:
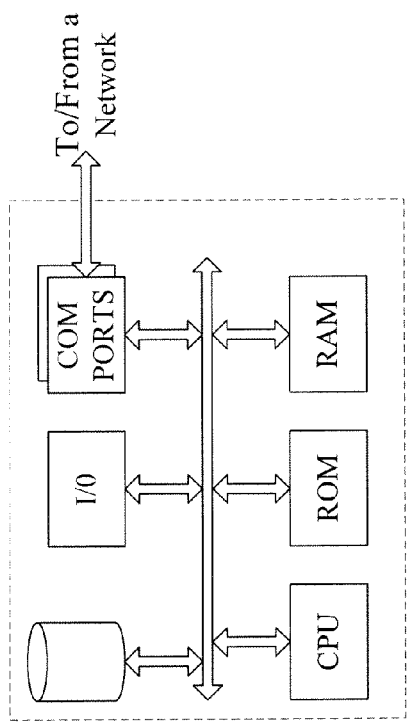
FIG. 7 is a simplified functional block diagram of a computer that may be configured as a host or server.
Figure 8:
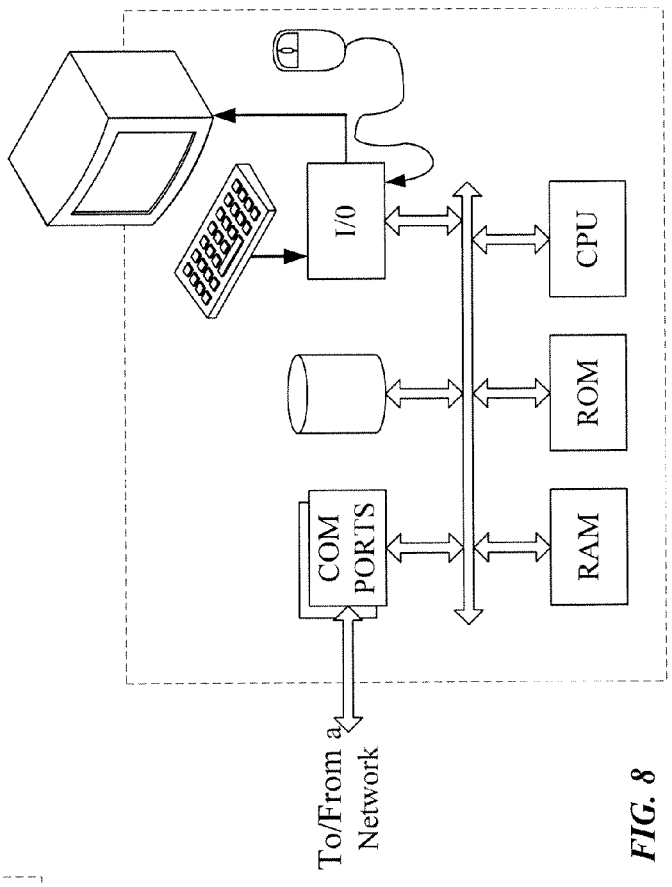
FIG. 8 is a simplified functional block diagram of a personal computer or other work station or terminal device.

The structure and operation of an exemplary mobile station has been discussed above relative to FIG. 6. FIGS. 7 and 8 provide functional block diagram illustrations of general purpose computer hardware platforms. FIG. 7 illustrates a network or host computer platform, as may typically be used to implement a server. FIG. 8 depicts a computer with user interface elements, as may be used to implement a personal computer or other type of work station or terminal device, although the computer of FIG. 8 may also act as a server if appropriately programmed. It is believed that those skilled in the art are familiar with the structure, programming and general operation of such computer equipment and as a result the drawings should be self-explanatory.

A server platform, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the methods outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like in mobile devices or computer platforms, which may provide non-transitory storage at any time for the software programming. All or portions of the software may at times be communicated through the Internet or various other telecommunication networks. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used by way of example in the detailed description above.

AAAP—AGPS Application Authorization Protocol
AGPS—Assisted Global Positioning System
CPU—Central Processing Unit
DNS—Domain Name System
EMS—Enhanced Messaging Service
FQDN—Fully Qualified Domain Name
GPS—Global Positioning System
GUI—Graphical User Interface
HDR—Header
ID—Identifier
iGMLC—Intelligent Gateway Mobile Location Center
IP—Internet Protocol
ISMI—International Mobile Subscriber Identity
LBS—Location Based Services
LMC—Location Manager Client
MDN—Mobile Directory Number
MIN—Mobile Identification Number
MLP—Mobile Location Protocol
MMS—Multimedia Messaging Service
NSN—Nokia Siemens Network
OMA—Open Mobile Alliance
PDA—Personal Digital Assistant
RAM—Random Access Memory
RF—Radio Frequency
SLIA—Standard Location Immediate Answer
SLIR—Standard Location Immediate Request
SLIS—Standard Location Immediate Service
SMS—Short Message Service
SSL—Secure Sockets Layer
SUPL—Secure User Plane Location
VOCODER—Voice Coding and Decoding Circuitry
XCVR—Transceiver
XML DTD—Extensible Markup Language Document Type Definition

What is claimed is:

1. A method comprising steps of:
   transmitting a Mobile Location Protocol (MLP) request message through a wireless mobile communication network, from a validation program running on a mobile station, to a Secure User Plane Location (SUPL) server;
   the MLP request message containing credential information for an Assisted Global Positioning System (AGPS) application, separate from the validation program, running on the mobile station;
   receiving a MLP response message, by the validation program, through the network from the SUPL server, responsive to the credential information;
   the MLP response message indicating whether the SUPL server has authorized the AGPS application; and
   responsive to an indication of authorization of the AGPS application, initiating a communication between the AGPS application and the SUPL server, through the network, to implement a function of the AGPS application including a determination of position of the mobile station.

2. The method of claim 1, wherein the MLP request message comprises an identification of the AGPS application, a password, an International Mobile Subscriber Identity (IMSI), and a duration.

3. The method of claim 1, wherein the indication of authorization comprises an indication of authorized duration.

4. A mobile station comprising:
 a wireless transceiver for wireless mobile communication through a wireless mobile communication network;
 a Global Positioning System (GPS) receiver;
 a processor coupled to the transceiver and the GPS receiver;
 a memory accessible by the processor;
 programming in the memory for the processor, wherein execution of the programming by the processor configures the mobile station to perform functions, including functions to:
 transmit a Mobile Location Protocol (MLP) request message from a validation program, running on the mobile station, through the network to a Secure User Plan Location (SUPL) server;
 the MLP request message containing credential information for an Assisted Global Positioning System (AGPS) application, separate from the validation program, running on the mobile station;
 receive a MLP response message, by the validation program separately from the AGPS application, through the network from the SUPL server, responsive to the credential information;
 the MLP response indicating whether the SUPL server has authorized the AGPS application; and
 responsive to an indication of authorization of the AGPS application, initiate a communication between the AGPS application and the SUPL server, through the network to implement a function of the AGPS application comprising a determination of position of the mobile station.

5. The mobile station of claim 4, wherein the MLP request message comprises an identification of the AGPS application, a password, an International Mobile Subscriber Identity (ISMI), and a duration value.

6. The mobile station of claim 4, wherein the indication of authorization comprises an indication of authorized duration.

7. A method comprising steps of:
 at a server, receiving from a validation program running on a mobile station, through a wireless mobile communication network, a Mobile Location Protocol (MLP) request message containing credential information for an Assisted Global Positioning System (AGPS) application, separate from the validation program, running on the mobile station;
 based on the credential information, determining whether the AGPS application is authorized for AGPS transactions with the server; and (a) transmitting a MLP response message, through the network to the validation program, indicating that the AGPS application is authorized for AGPS transactions; and (b) initiating a communication between the AGPS application and the server, through the network, to implement a function of the AGPS application comprising a determination of position of the mobile station.

8. The method of claim 7, wherein the MLP request message comprises an identification of the AGPS application, a password, an International Mobile Subscriber Identity (ISMI), and a duration value.

9. The method of claim 7, wherein the indication of authorization comprises an indication of authorized duration.

10. The method of claim 7, wherein the communicating between the AGPS application and the server to implement the function of the AGPS application occurs in a separate communication from the MLP response message after the transmitting of the MLP response message.

11. A location determination server comprising:
 an interface, for communication through a wireless mobile communication network with a mobile station;
 a processor coupled to the interface;
 a storage device accessible by the processor;
 programming in the storage device of the processor, wherein execution of the programming by the processor configures the location determination server to perform functions, including functions to:
 receive, through the network from a validation program, running on the mobile station, a Mobile Location Protocol (MLP) request message containing credential information for an Assisted Global Positioning System (AGPS) application, separate from the validation program, running on the mobile station;
 based on the credential information, determining whether the AGPS application is authorized for AGPS transactions with the server; and
 responsive to a determination that the AGPS application is authorized:
  (a) transmitting a MLP response message, through the network to the validation program, indicating that the AGPS application is authorized for AGPS transactions; and
  (b) initiating a communication between the AGPS application and the server, through the network to implement a function of the AGPS application comprising a determination of position of the mobile station.

12. The location determination server of claim 11, wherein the MLP request message comprises an identification of the AGPS application, a password, an International Mobile Subscriber Identity (ISMI), and a duration value.

13. The location determination server of claim 11, wherein the indication of authorization comprises an indication of authorized duration.

14. The location determination server of claim 11, wherein the communicating between the AGPS application and the server to implement the function of the AGPS application occurs in a separate communication from the MLP response message after the transmitting of the MLP response message.

* * * * *